E. R. KLIEN & H. R. LINDNER.
MULTIAXLE RAILWAY VEHICLE.
APPLICATION FILED APR. 16, 1914.
1,100,577.
Patented June 16, 1914.
8 SHEETS—SHEET 3.
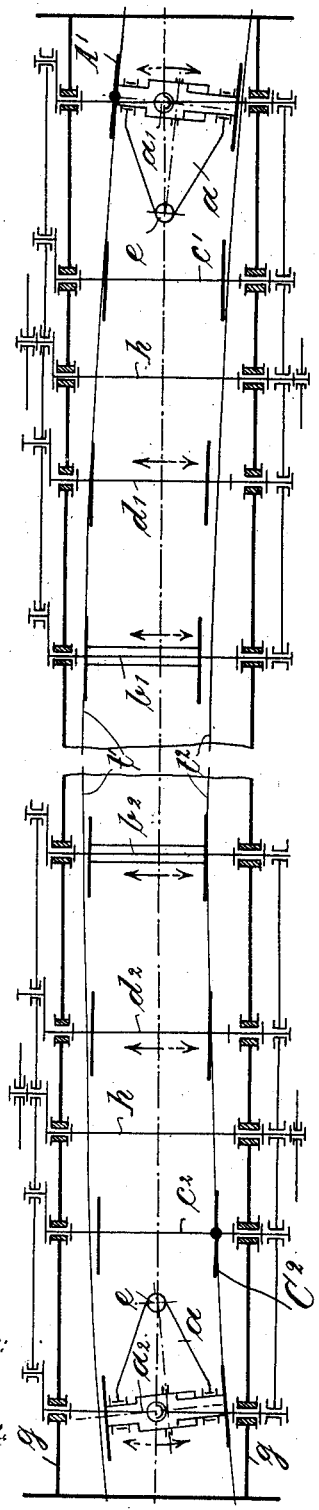
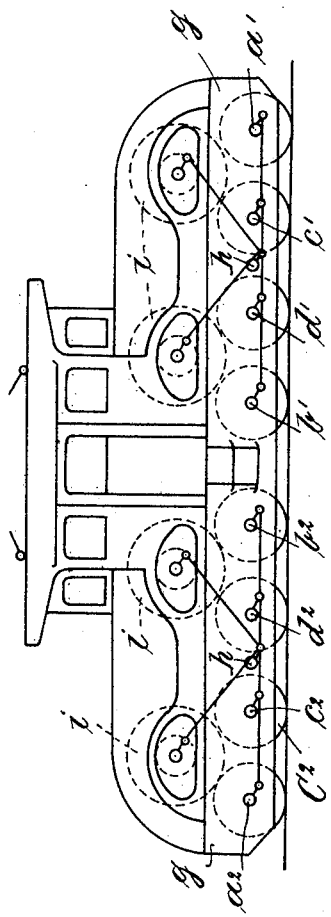

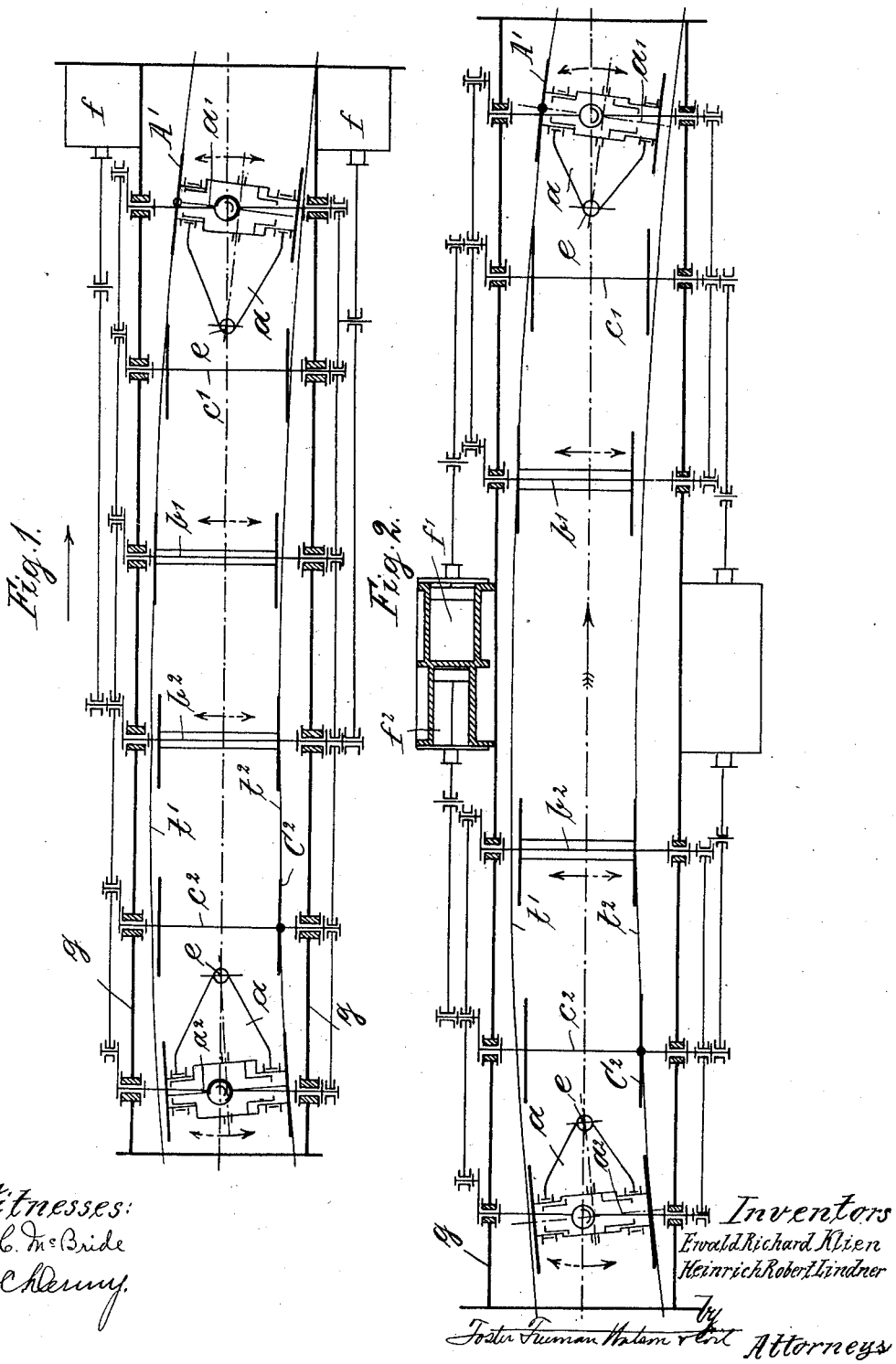

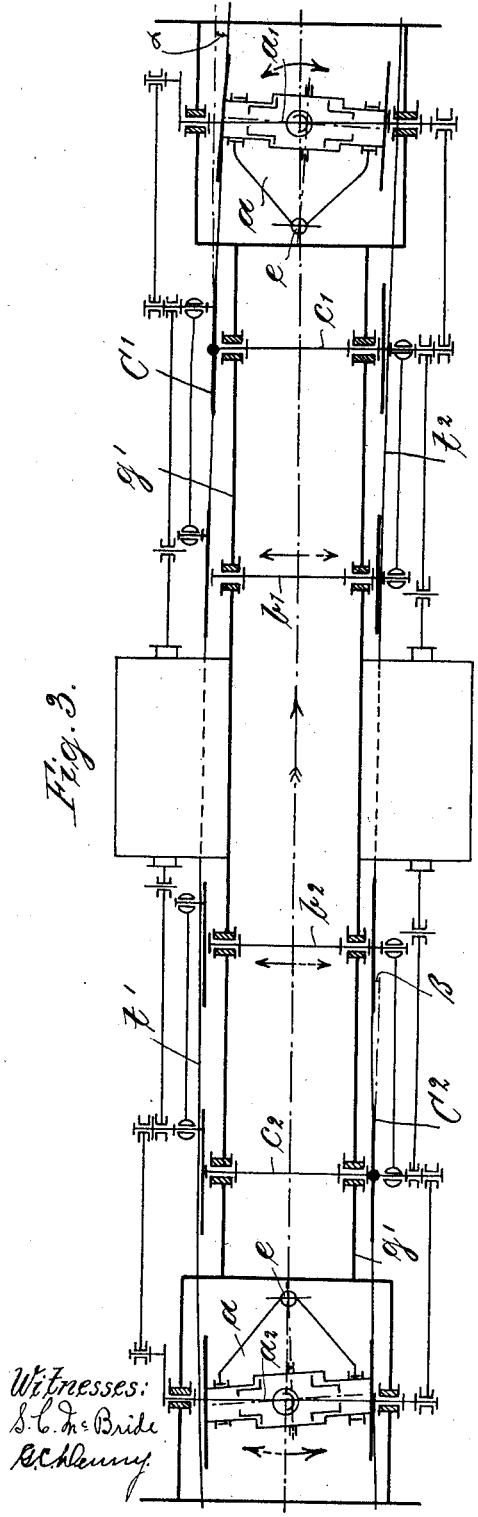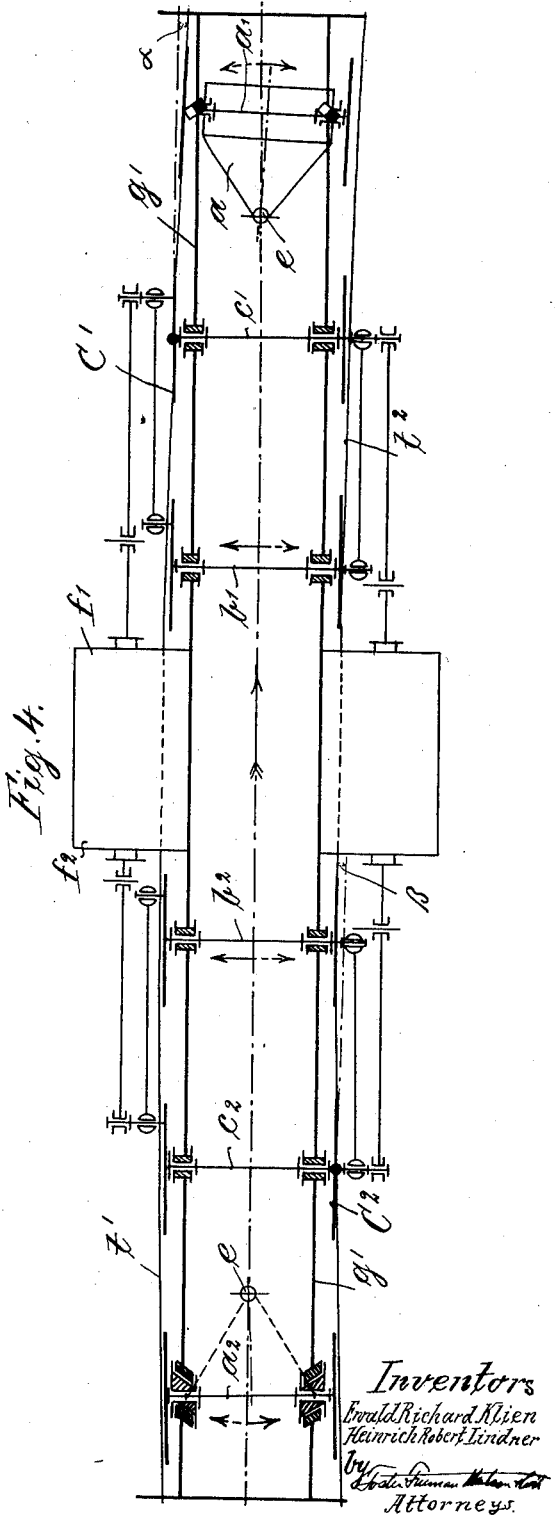

E. R. KLIEN & H. R. LINDNER.
MULTIAXLE RAILWAY VEHICLE.
APPLICATION FILED APR. 16, 1914.
1,100,577.
Patented June 16, 1914.
8 SHEETS—SHEET 4.
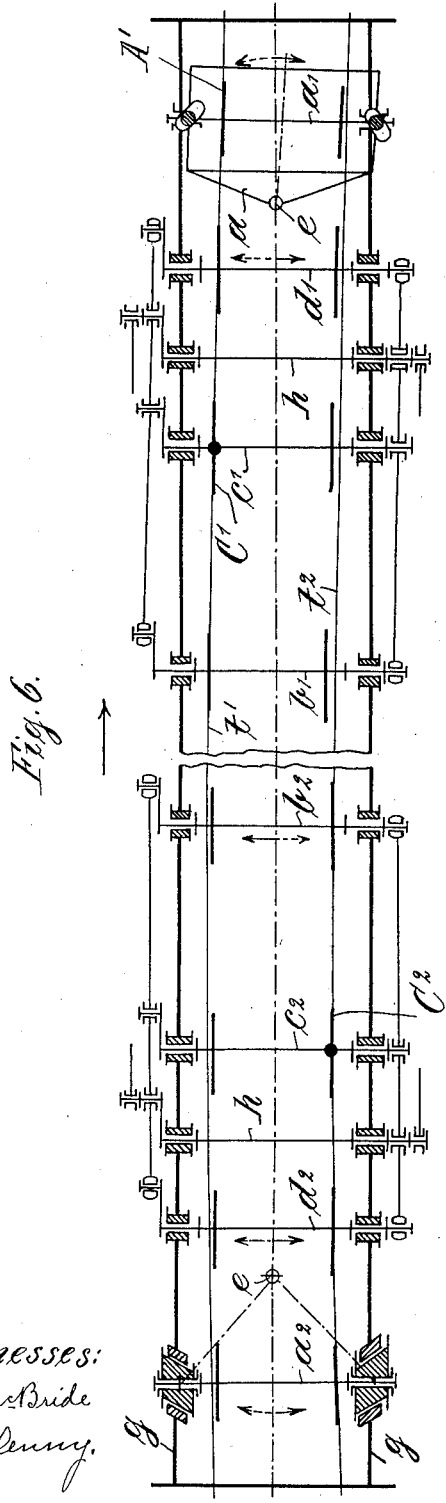
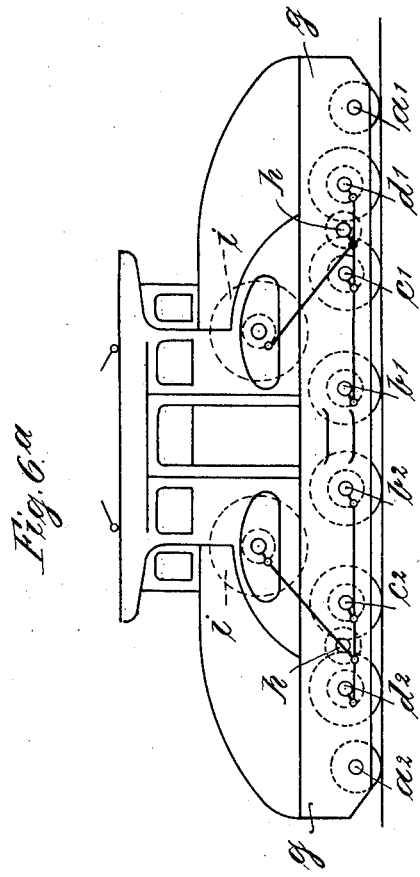
Witnesses:
S. C. McBride
G. C. Henny.
Inventors
Ewald Richard Klien
Heinrich Robert Lindner
By Foster Freeman Watson Hoit
Attorneys

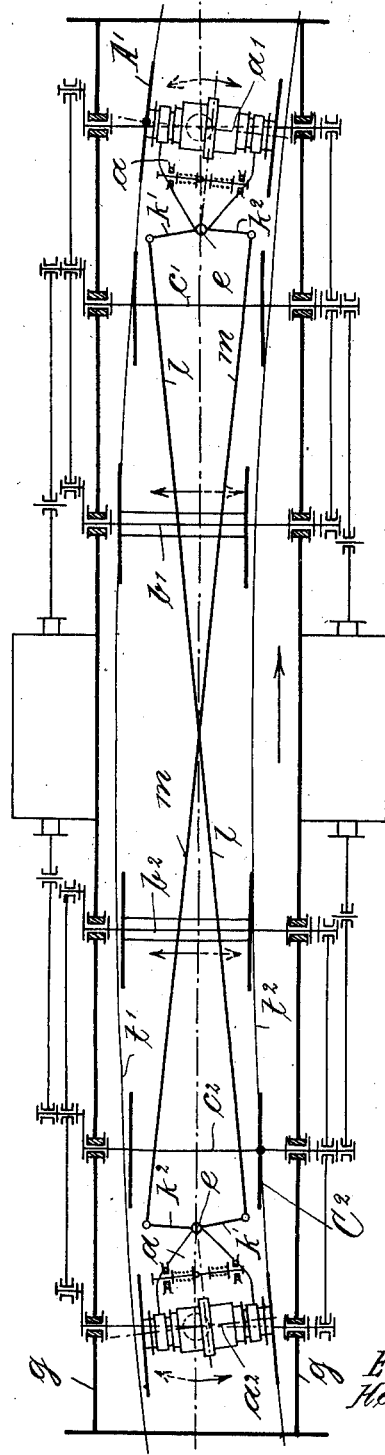

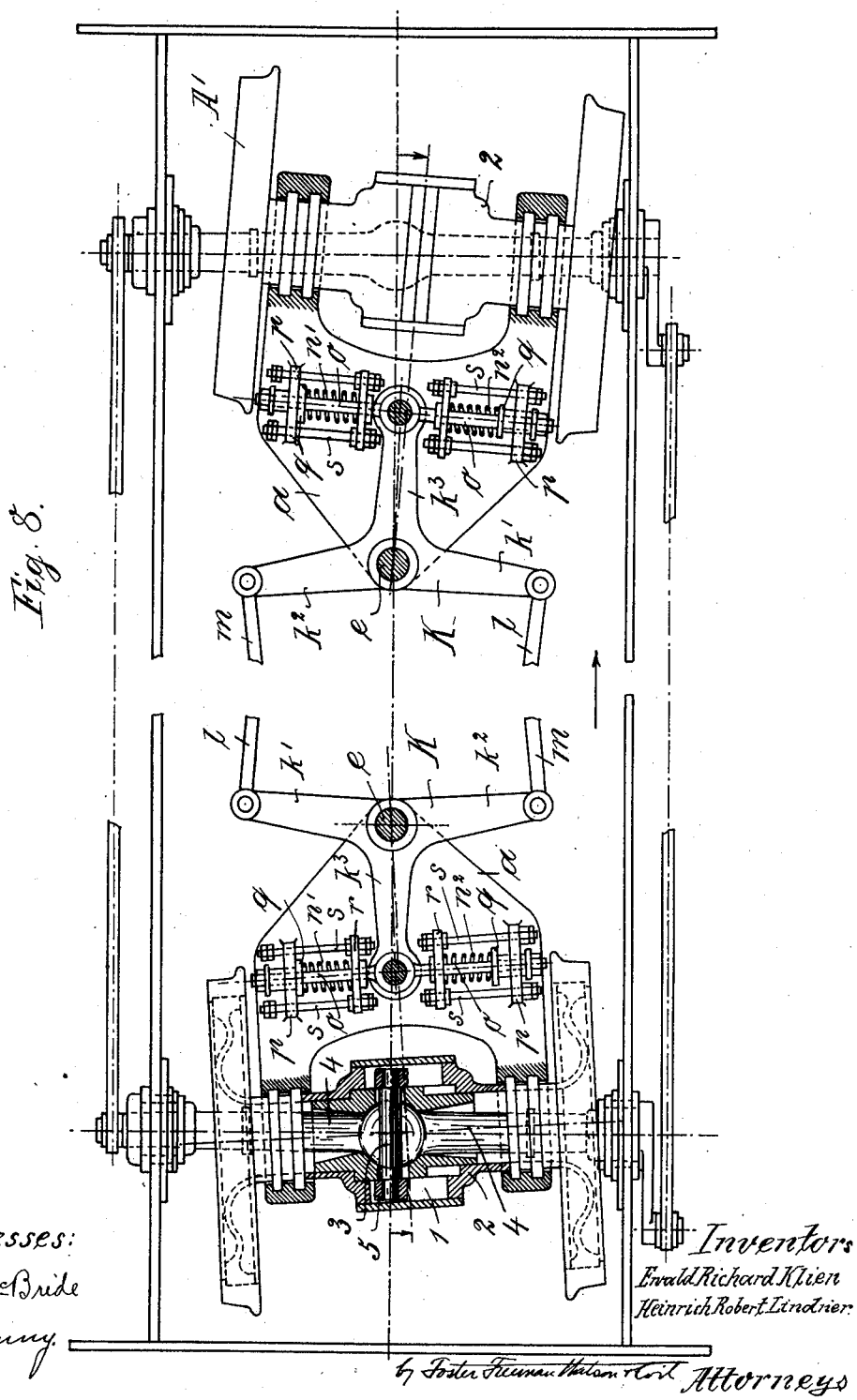

E. R. KLIEN & H. R. LINDNER.
MULTIAXLE RAILWAY VEHICLE.
APPLICATION FILED APR. 16, 1914.
1,100,577.
Patented June 16, 1914.
8 SHEETS—SHEET 7.
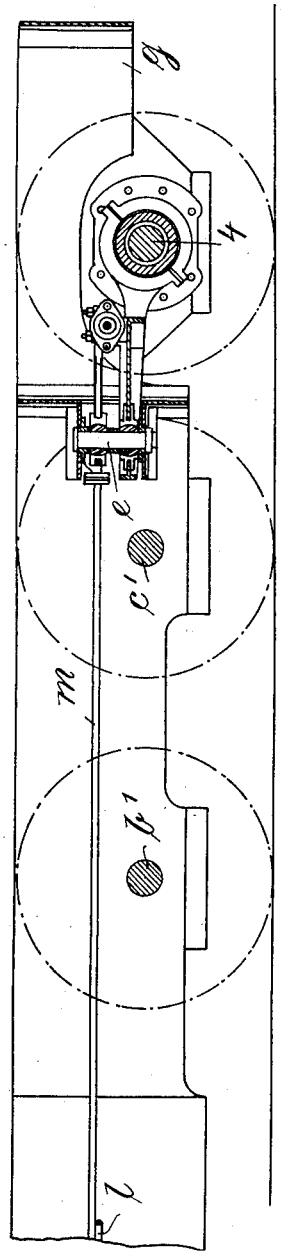
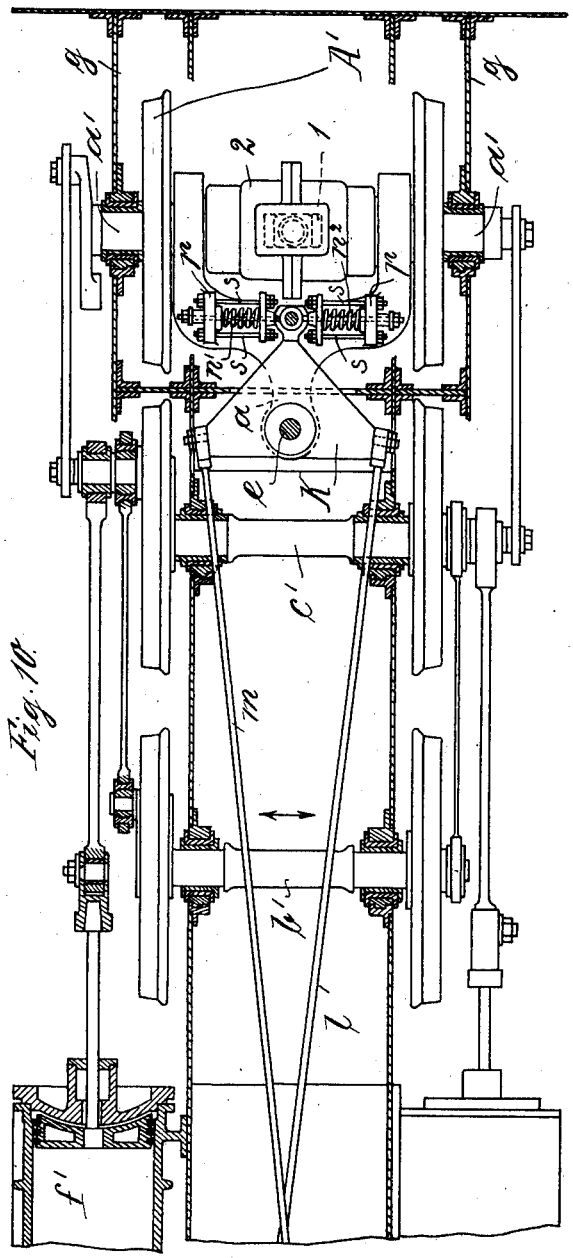

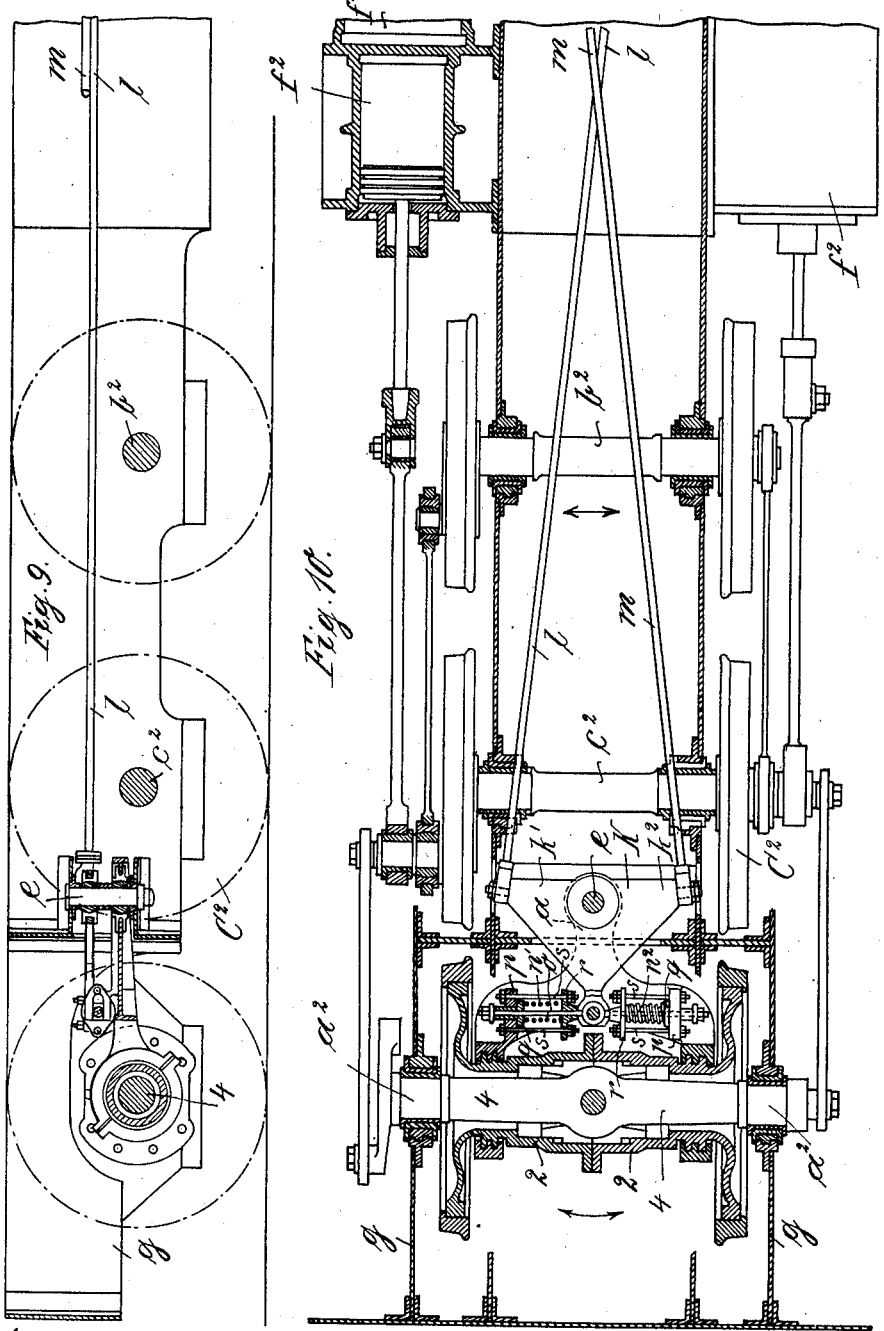

UNITED STATES PATENT OFFICE.

EWALD RICHARD KLIEN AND HEINRICH ROBERT LINDNER, OF DRESDEN, GERMANY.

MULTIAXLE RAILWAY-VEHICLE.

1,100,577.  Specification of Letters Patent.  Patented June 16, 1914.

Application filed April 16, 1914. Serial No. 832,334.

*To all whom it may concern:*

Be it known that we, EWALD RICHARD KLIEN and HEINRICH ROBERT LINDNER, subjects of the King of Saxony, residing at Dresden, Germany, have invented certain new and useful Improvements in Multiaxle Railway-Vehicles, of which the following is a specification.

This invention relates to railway rolling-stock particularly adapted for negotiating curves and the object is to provide a multi-axle railroad vehicle having a long wheel base and capable of running at high speeds on even sharp curves without derailing and without endangering the stability of the vehicle.

The present invention is equally applicable to either locomotives, passenger or freight cars or other railway rolling stock.

According to the present invention, the locomotive or other railroad vehicle, which has the usual radially adjustable end axles, has the whole of its axles mounted in bearings in the main frame or the whole of the axles with the exception of the adjustable end axles mounted in the main frame, and the two end axles form with the other axles of the main frame two axle groups each of which comprises an end axle, one or two axially movable axles, capable of sufficient axial movement or play to cause their wheels to bear against the rail, and a fixed axle. The term "fixed axle" is intended to denote an axle having no axial movement or play or which is capable of only very slight play in its bearings. The distance of the pivotal axis of each end axle from the axle, that is to say the radius bar or truck length, and the angular displacement of the end axles about their pivots are so limited that the wheels of the end axles may be displaced when the vehicle is negotiating moderate curves but will guide the vehicle on sharper curves as will be hereinafter more fully set forth. In the case of locomotives the coupled axles which are all mounted in the main frame may be either all coupled together and driven from a single engine or motor or the two axle groups may be separately coupled and each group driven by its own engine or motor, the latter arrangement being preferred. The engines or motors may be either arranged separately on the main frame or compounded, in the case of steam locomotives the two steam engines at each side of the locomotive being preferably compounded or built end to end, this arrangement simplifying the construction and reducing the loss of heat due to radiation from the steam cylinders. In the case of six-axle vehicles, the axles comprise radially adjustable end axles of limited angular displacement and short radius bar or truck length, inner axially movable axles and fixed axles between each end axle and the inner movable axles. In the eight-axle vehicle there is a fixed and an axially movable axle between each end axle and the two inner movable axles. The seven-axle vehicle is made up of one half of a six-axle vehicle and one half of an eight-axle vehicle. Although the vehicle has a large number of axles and is consequently of very long wheel base it is capable of safely and reliably negotiating very sharp curves, since the wheels strike the rails at angles which never exceed the safe limit and since moreover the lateral thrust of the wheels which bear against the rails is comparatively small. Moreover by means of the intermediate slidable axles, which are displaced in the curve till either their outer or inner wheel runs on the corresponding rail, the stability of the vehicle in the outward direction especially on narrow gage railroads is increased without reducing the stability in the opposite direction.

In the known locomotives for negotiating curves, in which the axles are mounted in the main frame, the axles were hitherto not divided into groups. Thus for example, in the Gölsdorf type of locomotive, in order to facilitate the travel of the locomotive over curves, some of the driven axles are capable of sliding laterally until their wheel flanges bear against the rails, the axles remaining parallel to the other fixed axles. In the Klien-Lindner type of locomotive the end axles move axially and simultaneously radially and by means of a connecting rod the intermediate axles can also be displaced in the opposite direction to the end axles so that they, like the end axles, are brought with their wheels to bear against the rails of the curve. These known arrangements however only permit of the provision of at the most six driven axles whereas the present invention enables the number of axles to be increased to eight while simultaneously considerably increasing the distance between the axles. Moreover while keeping the stresses on the rail and bridges within safe limits the wheel pressure is also increased and thus the tractive force, in the case of locomotives, considerably increased.

In the known types of locomotives for negotiating curves having four or more coupled and driven axles divided into groups, all the axles are never mounted in the main frame. There are either two motor bogies, as in the Fairlie and Meyer types, or, when only one motor bogie is employed, the latter supports the axles of one group while the axles of the other group are mounted in the main frame. The main frame then carries the driving machine for the axles mounted therein, as in the Mallet and Rimrott types, or it carries a single driving machine for both groups of axles, as in the Hagans type. By the use of motor bogies a considerable part of the total weight of the machine parts is wasted so far as the tractive force of the locomotive is concerned while moreover considerable inconvenience arises in the arrangement of the controlling mechanism and steam pipes as well as in the maintenance and operation of the controlling mechanism and of the motors fixed upon the bogies.

Hitherto it has only been possible to drive up to six ungrouped coupled axles by a twin-cylinder steam engine. This arrangement certainly had the advantage of requiring only one controlling mechanism, but necessitated very large steam cylinders and prevented the use of the compound system since in this case the low pressure cylinder would require a diameter of almost impossible construction and could not possibly be accommodated in the space available. The high piston rod thrust arising also in the tandem arrangement of the two cylinders on each side of the locomotive moreover leads to exceptionally strong driving pins and very heavy driving rods. The difficulties in the manufacture and maintenance of the coupling rods and the maintenance of the parallel position of the axles increase with the number of axles coupled together, which difficulties are still more considerably increased by the expansion of the main frame heated by the steam boiler. Thus the wear of the driving and coupling pins as well as of the rod bearings, moreover also the self resistance of the locomotive both when running idly and driving increases therefore with the number of axles coupled together.

The driving of a large number of coupled axles by one motor seldom occurs in the case of electric locomotives, on account of the size of the motor then necessary, but would likewise give rise to difficulties in the dimensioning of the driving pins and the maintenance of the coupling rods and axle bearings as well as to considerable wear of the crank pins and rod bearings.

The grouping of the driving axles of the locomotive and the mounting of them in the main frame avoids the aforesaid difficulties and results in considerable advantages in the maintenance and management.

In order to still further facilitate the negotiation of curves by means of long wheelbase multi-axle vehicles and especially in order to reduce or entirely avoid the wheel flange thrusts of the fixed axles even in moderate curves, the radius trucks of both adjustable end axles are preferably connected together so as to move symmetrically by means of a spring connection consisting of two three-armed levers pivoted on the pivotal axes of the trucks and connected together by rods which cross each other and with the trucks through intermediate springs which are always in tension but have no effect in the middle position of the trucks.

In order that the invention may be more clearly understood reference will hereinafter be made to the accompanying drawings showing various embodiments of the invention by way of example.

Figure 1 is a diagram of a twelve-wheel coupled steam locomotive having only two steam cylinders. Figs. 2 and 3 are diagrams of two types of steam locomotive having twelve wheels coupled in two groups and the steam cylinders built end to end on each side of the locomotive. Fig. 4 is a diagram of an eight-wheel coupled steam locomotive with leading and trailing uncoupled axles, forming two axle groups each comprising three axles. Fig. 5 is a diagram and Fig. 5ª a side view of an electric locomotive having 16 wheels coupled in two groups and driven from four motors. Fig. 6 is a diagram and Fig. 6ª a side view of a 12 wheel coupled electric locomotive having leading and trailing uncoupled axles forming two axle groups each comprising four axles and with only two driving motors; Fig. 7 is a diagram of a steam locomotive similar to that shown in Fig. 2 but with the end trucks connected together. Fig. 8 is a detail view showing the connected end trucks of Fig. 7 parts being shown in section. Fig. 9 is a side view and Fig. 10 a plan view of the underframe of a mountain locomotive having twelve wheels coupled in two groups and capable of negotiating curves of 170 meters radius; the radially adjustable end axles being of the Klien-Lindner type and connected together.

In order that the parts may be shown on as large a scale as possible, each of said figures is made in two parts.

Similar reference characters are employed to designate corresponding parts throughout the several views.

For the sake of simplicity the slight axial play of the "fixed" axles has not been shown on the drawings.

The thrust points of the wheels guiding the locomotive in the curve are indicated in Figs. 1 to 7 by small black dots.

Referring now to Fig. 1 which shows a twelve-wheel coupled locomotive on a sharp curve with all the axles mounted in an outer frame and driven by two steam cylinders, the outer rail is indicated by $t'$ and the inner rail by $t^2$. The end axles $a'$ and $a^2$ are radially adjustable coupled axles of the Klien-Lindner type and are capable of only limited angular displacement while the trucks or radius frames $a$ are of short length, that is from the pivot $e$ to the axle $a'$ or $a^2$. The inner axles $b'$ and $b^2$ are axially movable hollow axles of the Klien-Lindner type and the axles $c'$ and $c^2$ are "fixed" axles. The whole of the axles are coupled up as shown to the steam cylinders $f$, and are mounted in an outer frame $g$. In the position shown on the drawings the wheels $A'$ and $C^2$ of the axles $a'$ and $c^2$ guide the locomotive in the curve.

Fig. 2 shows a locomotive differing only from Fig. 1 in that the group of axles $a'$, $b'$, $c'$ is coupled to a steam cylinder $f'$ and the group of axles $a^2$, $b^2$, $c^2$ to steam cylinders $f^2$, the steam cylinders $f'$ and $f^2$ being arranged end to end.

Fig. 3 differs only from Fig. 2 in that the locomotive is shown on a moderate curve when the wheels $C'$ and $C^2$ of the axles $c'$ and $c^2$ guide the locomotive and the axles $b'$, $c'$, and $b^2$, $c^2$ instead of being mounted in an outer frame as in Figs. 1 and 2 are mounted in an inner frame $g'$ while the axially movable axles $b'$ and $b^2$ are solid axles.

In the modification shown in Fig. 4 the axles $b'$ and $c'$ are coupled together and driven by the steam cylinders $f'$ while the axles $b^2$ and $c^2$ are coupled together and driven by the steam cylinders $f^2$. The end axles $a'$ and $a^2$ are uncoupled axles, $a'$ being shown of the Bissel type and $a^2$ of the Adam type, and all the axles are mounted in an inner frame $g'$. As in Fig. 3 the axles $b'$ and $b^2$ are axially movable solid axles and the locomotive is guided in the moderate curve by the wheels $C'$ and $C^2$.

The electric locomotive shown in Figs. 5 and 5a has eight axles coupled in two groups and all mounted in the outer frame $g$. Each group of axles is driven through an auxiliary crank shaft $h$ from a pair of electric motors $i$. The end axles $a'$ and $a^2$ are radially adjustable coupled axles as in Fig. 1. The inner axles $b'$ and $b^2$ are axially movable hollow axles while the axles $c'$ and $c^2$ are fixed axles as in Fig. 1. The additional axles $d'$ and $d^2$ intermediate the axles $b'$, $c'$ and $b^2$, $c^2$ respectively are axially movable solid axles. The locomotive is shown on a sharp curve when it is guided by the wheels $A'$ and $C^2$.

Figs. 6 and 6a show an electric locomotive on a moderate curve which has likewise eight axles but in this case the end axles are uncoupled axles while the other axles are coupled in two groups. All the axles are mounted in an outer frame $g$, the end axle $a'$ being shown as of the Bissel type and the end axle $a^2$ of the Adam type. The coupled axles are driven through auxiliary crank shafts $h$ from motors $i$. The axles $b'$, $b^2$, $d'$, $d^2$ are axially movable solid axles while the axles $c'$ and $c^2$, intermediate the axles $b'$, $d'$ and $b^2$, $d^2$ respectively, are fixed axles. The locomotive is guided on the curve shown by the wheels $C'$ and $C^2$.

Fig. 7 shows the underframe of a locomotive of the type shown in Fig. 2 but having the end axles $a'$ and $a^2$ connected together. Although the end axles $a'$ and $a^2$ are illustrated as coupled axles it will of course be manifest that uncoupled end axles could be connected together in a similar manner.

As shown in detail in Fig. 8 the end axles $a'$ and $a^2$ are carried on trucks $a$ pivoted on center pins $e$. Also mounted to turn on the center pins $e$ are three-armed levers K, the arms $k'$ of the levers being connected by a rod $l$ and the arms $k^2$ by a rod $m$ which crosses the rod $l$. The third arm $k^3$ of the levers K is connected to the truck $a$ through the springs $n'$ and $n^2$, the latter being supported on bolts $o$ fixed to the arm $k^3$ and passing through lugs $p$ on the truck $a$. Each spring bears at one end against a collar $q$ on the bolt $o$ and at the other end against a plate $r$ guided on the bolt $o$ by means of guide bolts $s$ passing through the lug $p$.

In Figs. 7 and 8 the locomotive is shown on a sharp curve when the springs $n'$ and $n^2$ of the leading truck are under full stress. The springs are however adjusted so as to be also under compression in the middle position of the trucks $a$. It will be manifest that when the trucks $a$ swing out to one side or the other, the springs $n'$ and $n^2$ will be further strained. If desired, alternately acting springs might be employed or a single spring adapted to carry out the function of the two springs $n'$ and $n^2$.

Figs. 9 and 10 are working drawings showing the underframe of a locomotive constructed on the principle of Figs. 7 and 8.

It will, of course, be manifest that the arrangements shown on the drawings may be likewise applied to passenger or freight cars or other rolling stock on dispensing with the engines or motors and employing uncoupled axles.

The function of the vehicle on various curves will now be described.

The locomotive or vehicle is guided on straight or only slightly curved sections by the wheels of the fixed axles $c'$ and $c^2$ of the two axle groups (see Figs. 3, 4 and 6), while in sharper curves, as soon as the angle with which the wheels of the fixed axles $c'$ and $c^2$ strike the rails reaches the safe limit, the vehicle is guided by the outer wheel $A'$ of the end axle $a'$ and the inner wheel $C^2$ of the rear fixed axle $c^2$ (Figs. 1, 2, 5 and 7).

If all the axles were mounted in the main frame of the vehicle and were fixed, that is to say, neither axially movable nor radially adjustable, their relative position on entering and negotiating a curve would not alter and the end wheels would guide the vehicle in the curve. The outer wheel of the front axle would bear laterally against the outer rail and strike it at an angle which would depend on the ratio of the total wheel base of the vehicle to the radius of the curve and the play of the wheels in the wider gage of the curve. The rear axle then tends to assume a radial position and once it attains this position it will remain radial in the curve. If, however, the extra gage width of the curve is not sufficient to allow the rear axle to attain the radial position, the rear inner wheel will strike the inner rail at an angle, and owing to the play of the wheels in the curve, the rear wheel will strike the inner rail at an angle $ß$ which is considerably smaller than the angle $α$ with which the leading wheel strikes the outer rail. This will be better understood by reference to the fixed axles $c'$ and $c^2$ of Figs. 3 and 4. Every axle whose wheel bears against the rail and strikes it at an angle will be constantly moved transversely to the rail by the latter owing to the horizontal thrust or frictional force which is the product of the vertical wheel pressure and the coefficient of friction between the wheel tread and the rail. Every fixed axle whose wheels do not bear laterally against the rails and which is not radial will be constantly moved transversely to the rail by the main frame with the same pressure as the other axles are moved. If now the vehicle has fixed inner axles, these will be constantly moved transversely with the vehicle unless one of them has just reached the radial position in the curve. The pressure necessary to move the axles inwardly will be obtained chiefly from the thrust point of the leading wheel and transmitted through the bearings of the leading axle to the main frame and from thence to the axle to be inwardly moved through its bearings. In virtue of this, the lateral thrust of the leading wheel against the outer rail is considerably increased and that of the rear wheel against the inner rail is somewhat reduced. In a similar manner, in the case of a long wheel base when the rear wheel does not bear laterally against the rail owing to the wheel of the neighboring axle bearing laterally against the rail either tangentially or at an angle, the rear axle which strives to move inwardly must be constantly moved outwardly. This is effected by the pressure at the thrust point of the wheel of the neighboring axle which is transmitted through the bearings of the latter axle to the main frame and from thence to the rear axle through its bearings. The lateral thrust of the wheel of the axle next to the rear axle is thus considerably increased and that of the leading wheel moderately increased. If, however, the axles to be moved in the curve are capable of movement transversely to the main frame till their wheels run against the rail toward which they strive, the pressure necessary to move them will be imparted to them by the rail side. Thus as illustrated on the drawings, the axles $b'$, $b^2$, $d'$ and $d^2$ are capable of moving transversely to the main frame. The wheels of those axles which move transversely to the main frame i. e. of the axles $b'$, $b^2$, $d'$ and $d^2$, then strike the rail in most cases at a considerably smaller angle than the guiding wheel of the leading axle.

Although the wear of the rail side and especially of the wheel flange increases with the angle with which the wheel strikes the rail and although the tractive force necessary to move the vehicle also increases, only a still greater increase of this angle will lead to the danger of derailing, the latter being caused chiefly by an excessive increase of the lateral thrust of the guiding wheel of the foremost guiding axle. This lateral thrust must therefore be kept as low as possible and therefore as many as possible of the non-guiding axles should be capable of movement transversely to the main frame when negotiating the sharpest arising curve and when negotiating points or switches, until the wheels run against the rails. As far as the connecting rods of the axles of locomotives permit, the axles may be movable in their bearings, as shown, for example, in the case of the axles $b'$ and $b^2$ of Fig. 10, but for greater displacements the usual hollow axles may be used as in Figs. 1, 2, 5 and 7. Since the movable hollow axles somewhat increase the cost of construction, it is desirable to make use as far as possible of solid axles movable in their bearings. To this end in suitable cases the guiding axles may also be capable of slight movement in their bearings. The movement of the other movable axles will then be increased or diminished to the extent of this movement according to their distance from the guiding axles. The striking angle of the wheel of the front guiding axle will then be increased slightly and that of the wheel of the rear guiding axle correspondingly reduced.

In the case of vehicles having a large number of intermediate axles and consequently of long wheel base, the angle with which the wheel of the guiding front axle (if fixed) would strike the outer rail would be too great when negotiating sharp curves. The end axles are therefore made radially adjustable and to some extent non-guiding, as usual, that is to say, they are adapted to swing out and move axially as shown particularly in Fig. 8 of the drawings. In the case of a locomotive having all its wheels coupled, the coupled end axles are of the Klien-Lindner type as in Figs. 1, 2, 3, 5, 7, 8, 9 and 10. Uncoupled end axles are preferably of the Bissel or Adam type as in Figs. 4 and 6. The two fixed axles $c'$ and $c^2$ intermediate the end axles then guide the vehicle in moderate curves as in Figs. 3, 4 and 6. Even then, however, if the distance between the axles $c'$, $c^2$ is very great, a further increase in the curvature of the track would cause the wheel of the foremost guiding axle $c$ to strike the rail at a dangerous angle and thus increase the danger of derailing. By the present invention however it is possible to increase the total wheel base even for sharp curves without exceeding the safe limit of the angle with which the wheel of the foremost fixed axle $c'$ strikes the rail and thus enable the number of axles to be increased and, in the case of locomotives, enabling a larger number of driven axles to be employed. This is attained, as shown more clearly in Fig. 8, by limiting the swing and the radius length of the adjustable end axles in such a manner that the vehicle is guided at the front in the curve, when the safe limit of the striking angle $\alpha$ of the foremost guiding wheel of the fixed axle $c'$ is attained, by the outer wheel $A'$ of the foremost end axle $a'$ which will then have been swung out beyond its radial position and will remain in this position on further increase of the curvature, as in Figs. 1, 2, 5 and 7. The flange of the wheel $C'$ of the fixed axle $c'$ then moves farther and farther from the outer rail as the curvature increases, the axle $c'$ being at the same time moved inward. The pressure necessary to move the axle $c'$ is obtained from the thrust point of the wheel $A'$ of the end axle $a'$ whose lateral thrust would considerably increase if the axle $a'$ also had to be moved inwardly. To obviate this the pivot $e$ of the axle $a'$ is arranged so near the axle that when the wheel $A'$ guides the vehicle, the axle $a'$ will always be fully swung out beyond its radial position and will only attain this position in very sharp curves. The wheel $A'$ therefore tends to run off the outer rail owing to the axle being swung out beyond its radial position and because the outer wheel $A'$ rolls through the track on a greater rolling circle, compared to the inner wheel of the axle $a'$, than corresponds to the ratio of the curvature of the outer and inner rails and, since the axle $a'$ is fully swung out, the wheel $A'$ will be prevented from running off the outer rail by the main frame $g$ and therefore constantly moved outward by the main frame transversely to the track so as to keep to the rail.

In the case of coupled end axles, the lateral displacement is limited as shown in Fig. 8 by the length of the slots 1 in the hollow wheel axle 2, a pin 3 projecting from the core axle 4 and fitting into blocks 5 guided in the slots 1. The lateral displacement of uncoupled end axles may be limited by limiting the movement of the axle in its guides in the usual manner.

The pressure necessary to move the adjustable end axle $a'$ outwardly and the pressure necessary to move the foremost fixed axle $c'$ inwardly almost equalize each other since they are opposed in direction and if no other axles require to be moved, there can consequently be no great lateral thrust where the front guiding wheel $A'$ bears against the rail.

By connecting the end axle trucks as illustrated in Figs. 7, 8 and 10 the lateral thrusts of the wheel flanges of the fixed axles $c'$, $c^2$ can be reduced or entirely avoided in even moderate curves.

If the end trucks are not connected the front axle $a'$ will be moved inward in the curve to a greater extent than the rear axle $a^2$ owing both to the curve itself and to the sharp angle which the line passing through the middle points of the two fixed axles $c'$, $c^2$ makes with the curve. It is necessary to insert the springs $n'$ and $n^2$ between the trucks and the connecting rods $l$, $m$ when the distance between the end axles $a'$, $a^2$ is great, in order to insure easy entry of the vehicle into sharp curves and into switches by causing the leading end axle $a'$ to swing out farther than the rear end axle $a^2$. By mounting the three-armed levers K on the pivots $e$ of the trucks any relative displacement of the two is avoided. When the two trucks are connected as in Figs. 7, 8 and 10, the lateral thrust of the outer wheel of the front fixed axle $c'$ against the outer rail and the thrust of the inner wheel of the rear fixed axle $c^2$ against the inner rail can be reduced by correspondingly putting the springs $n'$ and $n^2$ under stress until the lateral thrust is entirely avoided. The outer wheel of the front fixed axle $c'$ is therefore not only kept from bearing against the rail in sharp curves but also in moderate curves when the springs are correspondingly strained. Thus the guiding of the vehicle in all curves is transferred either in part or wholly from the fixed axles $c'$, $c^2$ to the end axles $a'$, $a^2$. When the wheels of the end axles $a'$, $a^2$ alone guide the vehicle, the latter will be brought into a position in which the line passing through the middle points of the fixed axles $c'$, $c^2$ no longer makes a sharp angle with the curve but in which the longitudinal center line of the total wheel base of the vehicle approaches the true chord of the curve. Thus when the end axles $a'$, $a^2$ are connected, the wheels of the fixed axles $c'$, $c^2$ strike the rails in moderate curves with little or no lateral thrust and the outer wheel of the leading axle $a'$ since the latter is swung out beyond its radial position, tends to run off the rail while the inner wheel of the rear end axle $a^2$ bears with a moderate thrust against the inner rail with its axle $a^2$ in or almost in the radial position. Thus in spite of the long total wheel base the vehicle offers very little resistance and there is very little wear of the wheel flanges and rail sides.

We claim:—

1. In a long wheel-base multi-axle railway locomotive for negotiating curves, an under-carriage comprising a main frame, a multiplicity of wheeled axles forming two groups each of which contains a radially adjustable end axle and fixed and axially movable axles, said fixed and axially movable axles being coupled and driven and being mounted in said main frame, the wheels of said fixed axles guiding the vehicle in moderate curves where as in sharper curves the vehicle is guided by the outer wheel of the leading end axle and by the inner wheel of the rear fixed axle.

2. In a long wheel-base multi-axle railway locomotive for negotiating curves, an under-carriage comprising a main frame, a multiplicity of wheeled axles all mounted in said main frame and forming two groups each of which contains a radially adjustable end axle and fixed and axially movable axles, said fixed and axially movable axles being coupled and driven, the wheels of said fixed axles guiding the vehicle in moderate curves where as in sharper curves the vehicle is guided by the outer wheel of the leading end-axle and by the inner wheel of the rear fixed axle.

3. In a long wheel-base multi-axle coupled railway locomotive for negotiating curves, an under-carriage comprising a main frame, a multiplicity of wheeled axles forming two groups each of which contains a radially adjustable end coupled axle and fixed and axially movable coupled axles, the wheels of said fixed axles guiding the vehicle in moderate curves whereas in sharper curves the vehicle is guided by the outer wheel of the leading end axle and by the inner wheel of the rear fixed axle.

4. In a long wheel-base multi-axle railway vehicle for negotiating curves, an under-carriage comprising a main frame, a multiplicity of wheeled axles forming two groups each of which contains a radially adjustable end axle and fixed and axially movable axles, said fixed and movable axles being mounted in said main frame whereby the wheels of said fixed axles guide the vehicle in moderate curves whereas the distance of said end axles from their pivots and their angular displacement are so limited that the front end axle is swung out beyond the radial position when the vehicle is guided by the wheels of said fixed axles, the guiding of the vehicle at the front being transmitted on sharper curves from the outer wheel of the forward fixed axle to the outer wheel of the front end axle.

5. In a long wheel-base multi-axle railway locomotive for negotiating curves, an under-carriage, comprising a main frame, a multiplicity of wheeled axles forming two groups each of which contains a radially adjustable end axle and fixed and axially movable axles, said fixed and axially movable axles being coupled and driven and mounted in said main frame, whereby the wheels of said fixed axles guide the vehicle in moderate curves whereas the distance of said end axles from their pivots and their angular displacement are so limited that the front end axle is swung out beyond the radial position when the vehicle is guided by the wheels of said fixed axles, the guiding of the vehicle at the front being transmitted on sharper curves from the outer wheel of the forward fixed axle to the outer wheel of the front end axle.

6. In a long wheel-base multi-axle coupled railway locomotive for negotiating curves, an under-carriage comprising a main frame, a multiplicity of wheeled axles forming two groups each of which contains a radially adjustable end coupled axle and fixed and axially movable coupled axles, whereby the wheels of said fixed axles guide the vehicle in moderate curves whereas the distance of said end axles from their pivots and their angular displacement are so limited that the front end axle is swung out beyond the radial position when the vehicle is guided by the wheels of said fixed axles, the guiding of the vehicle at the front being transmitted on sharper curves from the outer wheel of the forward fixed axle to the outer wheel of the front end axle.

7. In a long wheel-base multi-axle railway steam locomotive for negotiating curves, an under-carriage comprising a main frame, a multiplicity of wheeled axles forming two groups each of which contains a radially adjustable end axle and fixed and axially movable axles, a pair of steam cylinders mounted on said main frame at each side of said locomotive intermediate the axle groups and coupled up to said fixed and axially movable axles, the wheels of said fixed axles guiding the vehicle in moderate curves whereas in sharper curves the vehicle is guided by the outer wheel of the leading end axle and by the inner wheel of the rear fixed axle.

8. In a long wheel-base multi-axle railway steam locomotive for negotiating curves, an under-carriage comprising a main frame, a multiplicity of wheeled axles forming two coupled axle groups each of which contains a radially adjustable coupled end axle and fixed and axially movable coupled axles, a pair of steam cylinders mounted on said main frame at each side of the locomotive intermediate said axle groups and coupled up to said axles, the wheels of said fixed axles guiding the vehicle in moderate curves whereas in sharper curves the vehicle is guided by the outer wheel of the leading end axle and by the inner wheel of the rear fixed axle.

9. In a long wheel-base multi-axle railway steam locomotive for negotiating curves, an under-carriage, comprising a main frame, a multiplicity of wheeled axles forming two groups each of which contains a radially adjustable end axle and fixed and axially movable axles, a pair of steam cylinders arranged end to end on said main frame at each side of the locomotive intermediate said axle groups, the forward steam cylinders being coupled up to the fixed and axially movable axles of the front group and the rear steam cylinders being coupled up to the fixed and axially movable axles of the rear group, the wheels of said fixed axles guiding the vehicle in moderate curves whereas in sharper curves the vehicle is guided by the outer wheel of the leading end axle and by the inner wheel of the rear fixed axle.

10. In a long wheel-base multi-axle railway vehicle for negotiating curves, an under-carriage comprising a main frame, a multiplicity of wheeled axles forming two groups each of which contains a radially adjustable end axle and fixed and axially movable axles, said fixed and movable axles being mounted in said main frame, radial trucks supporting said end axles and a resilient connection between said trucks for obtaining a substantially symmetrical movement of said trucks.

11. In a long wheel-base multi-axle railway locomotive for negotiating curves, an under-carriage comprising a main frame, a multiplicity of wheeled axles forming two groups each of which contains a radially adjustable end axle and fixed and axially movable axles, said fixed and axially movable axles being coupled and driven and being mounted in said main frame, radial trucks supporting said end axles and a re-resilient connection between said trucks for obtaining a substantially symmetrical movement of said trucks.

12. In a long wheel-base multi-axle coupled railway locomotive for negotiating curves, an under-carriage comprising a main frame, a multiplicity of wheeled axles forming two groups each of which contains a radially adjustable end coupled axle and fixed and axially movable coupled axles, radial trucks supporting said end axles and a resilient connection between said trucks for obtaining a substantially symmetrical movement of said trucks.

13. In a long wheel-base multi-axle railway vehicle for negotiating curves, an under-carriage comprising a main frame, a multiplicity of wheeled axles forming two groups each of which contains a radially adjustable end axle and fixed and axially movable axles, said fixed and movable axles being mounted in said main frame, pivoted radial trucks supporting said end axles, a three armed lever pivoted on the pivot of each truck, cross connections between said levers and a resilient connection between each of said levers and its truck.

14. In a long wheel-base multi-axle railway vehicle for negotiating curves, an under-carriage comprising a main frame, a multiplicity of wheeled axles forming two groups each of which contains a radially adjustable end axle and fixed and axially movable axles, said fixed and movable axles being mounted in said main frame, a pivoted radial truck supporting each end axle, a three armed lever pivoted on the pivot of said truck, cross connections between the two arms of one lever and the two arms of the other lever, and a pair of springs interposed under stress between the third arm of each lever and its truck.

In witness whereof we have hereunto set our hands in the presence of two witnesses.

EWALD RICHARD KLIEN.
HEINRICH ROBERT LINDNER.

Witnesses:
PAUL ARRAS,
S. G. BUCHANAN,
CLARE SIMON,
ANNA BELZMANN.

Copies of this patent may be obtained for five cents each, by addressing the "Commissioner of Patents, Washington, D. C."